United States Patent
Pettey

(10) Patent No.: US 7,891,902 B2
(45) Date of Patent: Feb. 22, 2011

(54) HOBBY SERVO SHAFT ADAPTER

(75) Inventor: Brian Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 272 days.

(21) Appl. No.: 12/128,894

(22) Filed: May 29, 2008

(65) Prior Publication Data

US 2008/0317548 A1   Dec. 25, 2008

Related U.S. Application Data

(60) Provisional application No. 60/936,292, filed on Jun. 19, 2007.

(51) Int. Cl.
F16B 2/10   (2006.01)
(52) U.S. Cl. .................. 403/313; 403/305; 403/359.1
(58) Field of Classification Search ............ 403/110, 403/290, 303, 305, 313, 359.5; 310/75 R; 464/153, 154, 158, 182
See application file for complete search history.

(56) References Cited

U.S. PATENT DOCUMENTS

| 2,348,071 | A | * | 5/1944 | Johnstone | 403/305 |
|---|---|---|---|---|---|
| 2,838,329 | A | * | 6/1958 | Pressley | 403/204 |
| 3,820,357 | A | * | 6/1974 | Allison | 464/158 |
| 4,009,623 | A | * | 3/1977 | Smith et al. | 74/512 |
| 4,121,532 | A | * | 10/1978 | Coryell, III | 440/83 |
| 4,565,464 | A | * | 1/1986 | Nilsson | 403/290 |
| 4,728,218 | A | * | 3/1988 | Durham | 403/319 |
| 4,789,376 | A | * | 12/1988 | Grant | 464/154 |
| 5,006,007 | A | * | 4/1991 | Fischer et al. | 403/290 |
| 5,062,734 | A | * | 11/1991 | Vanzee et al. | 403/313 |
| 5,492,024 | A | * | 2/1996 | Siner | 74/89.22 |
| 5,655,849 | A | * | 8/1997 | McEwen et al. | 403/370 |
| 5,762,439 | A | * | 6/1998 | Siner | 403/359.6 |
| 5,855,145 | A | * | 1/1999 | Hosoi et al. | 74/552 |
| 6,234,506 | B1 | * | 5/2001 | Li | 280/280 |
| 6,506,120 | B1 | * | 1/2003 | Lockwood | 464/88 |
| 6,595,083 | B2 | * | 7/2003 | Hosoi et al. | 74/522 |
| 6,682,432 | B1 | * | 1/2004 | Shinozuka | 464/78 |
| 6,716,104 | B2 | * | 4/2004 | MacDonald | 464/89 |
| 6,840,701 | B2 | * | 1/2005 | DaCunha et al. | 403/290 |
| 6,872,023 | B2 | * | 3/2005 | Liao | 403/84 |
| 7,448,821 | B2 | * | 11/2008 | Meyer | 403/290 |
| 2004/0237679 | A1 | * | 12/2004 | Enright | 74/89.2 |
| 2006/0105844 | A1 | * | 5/2006 | Sweet et al. | 464/102 |
| 2006/0213319 | A1 | * | 9/2006 | Pettey | 74/640 |
| 2009/0066198 | A1 | * | 3/2009 | Pettey | 310/75 D |

* cited by examiner

*Primary Examiner*—Joshua T Kennedy
(74) *Attorney, Agent, or Firm*—Westman, Champlin & Kelly, P.A.

(57) ABSTRACT

An adapter is provided for coupling an output shaft of a servo to an auxiliary shaft. The adapter includes an adapter body having a longitudinal axis extending from a first end to a second end. The adapter body includes a first bore centered on the longitudinal axis and extending into the first end a first distance. The first bore is configured to accept a portion of the auxiliary shaft. The adapter body also includes a second bore centered on the longitudinal axis and extending into the second end a second distance. The adapter also includes an engagement member positioned within the second bore. The engagement member is configured to accept and engage a portion of the output shaft of the servo.

16 Claims, 3 Drawing Sheets

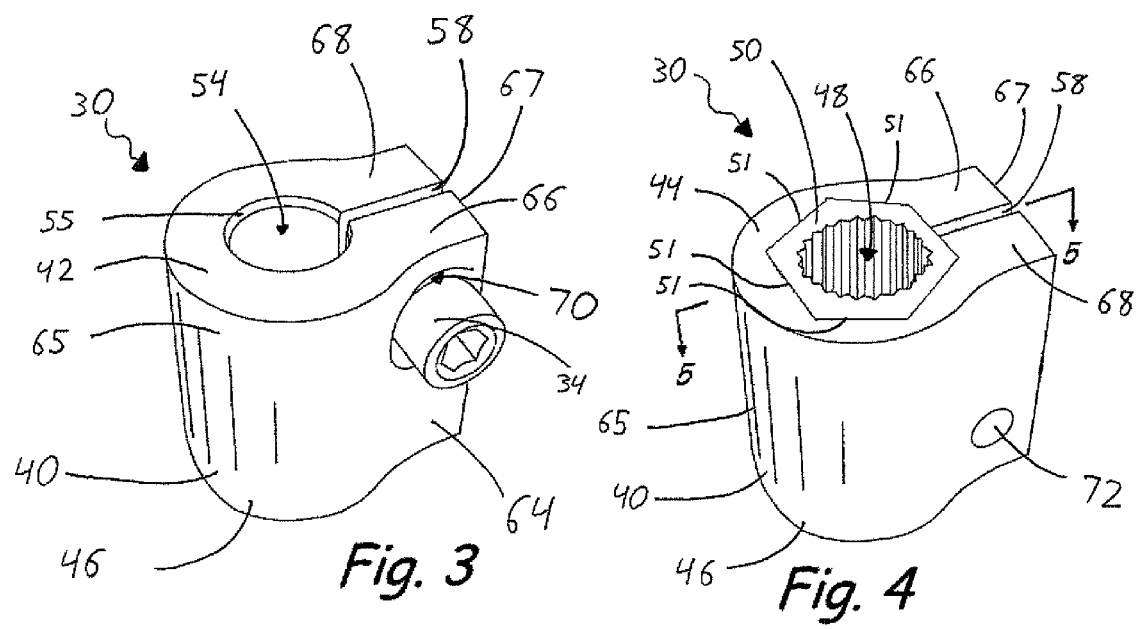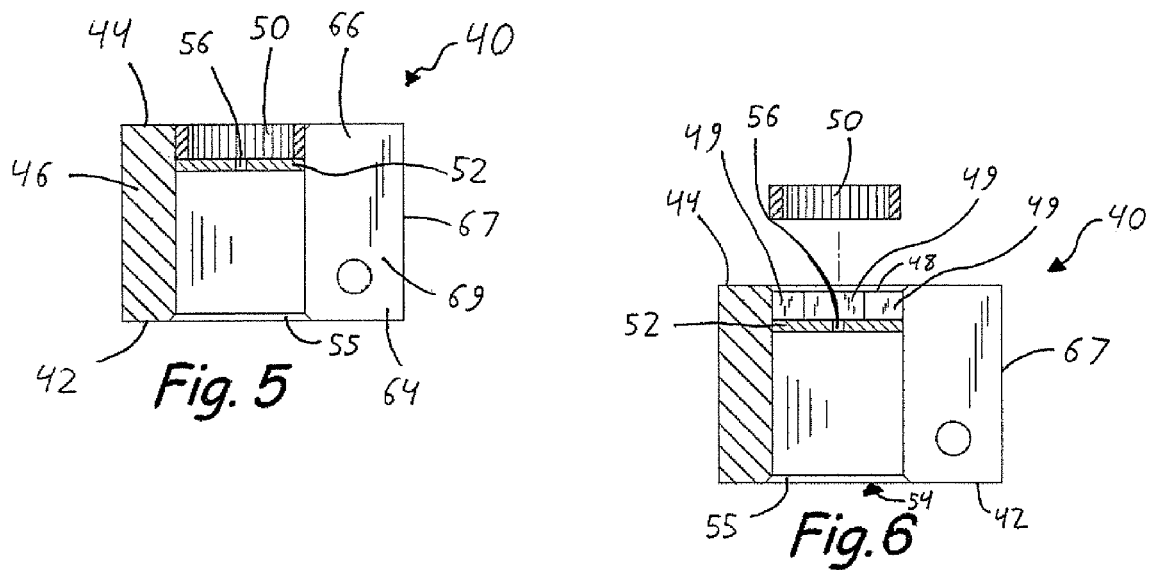

US 7,891,902 B2

HOBBY SERVO SHAFT ADAPTER

CROSS-REFERENCE TO RELATED APPLICATION

The present application is based on and claims the benefit of U.S. provisional patent application Ser. No. 60/936,292, filed Jun. 19, 2007, the content of which is hereby incorporated by reference in its entirety.

BACKGROUND

The present invention generally pertains to the hobby-mechanical industry. More specifically, the present invention pertains to an adapter configured to be coupled to a hobby servo output shaft for driving an auxiliary shaft.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servo motors that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but not limited to, hobby robotic applications and radio-controlled models (cars, planes, boats, etc.). One example of a hobby servo is the Futaba S-148 available from Futaba Corporation of America located in Schaumburg, Ill.

Ridges (or teeth) are typically distributed around the outside surface of the output shaft of a hobby servo. Thus, the hobby servo has a "male" spline configuration. Mechanism to be driven by the output shaft will typically have a corresponding "female" spline receiver adapted to engage the output shaft. For example, a gear having a toothed receiver portion may be engaged to the output shaft of a hobby servo. Currently, it can be difficult to engage a device that does not include a "female" spline configuration to a hobby servo.

Further, some applications require that shafts (i.e., axles, rods, beams, etc.) be driven (e.g., rotated) by a hobby servo. These shafts might be round and/or smooth, but could have a different shape (e.g., polygonal like triangle, square, etc.). Driving any shaft, regardless of shape, with the output shaft of a hobby servo presents challenges at least because the output shaft is typically not very durable. For some applications, there is a need to engage a shaft to the output shaft of a hobby servo such that the shaft can be driven (e.g., rotated) in line with the output shaft.

SUMMARY

An adapter is provided for coupling an output shaft of a servo to an auxiliary shaft. The adapter includes an adapter body having a longitudinal axis extending from a first end to a second end. The adapter body includes a first bore centered on the longitudinal axis and extending into the first end a first distance. The first bore is configured to accept a portion of the auxiliary shaft. The adapter body also includes a second bore centered on the longitudinal axis and extending into the second end a second distance. The adapter also includes an engagement member positioned within the second bore. The engagement member is configured to accept and engage a portion of the output shaft of the servo.

Other features and benefits that characterize embodiments of the present invention will be apparent upon reading the following detailed description and review of the associated drawings.

BRIEF DESCRIPTION OF THE DRAWINGS

FIG. 3 is a top perspective view of the adapter of FIG. 1.

FIG. 4 is a bottom perspective view of the adapter of FIG. 1.

FIG. 5 is a cross-sectional view along line 5-5 of FIG. 4.

FIG. 6 is an exploded cross-sectional view of the adapter shown in FIG. 5.

DETAILED DESCRIPTION

Figure 1:
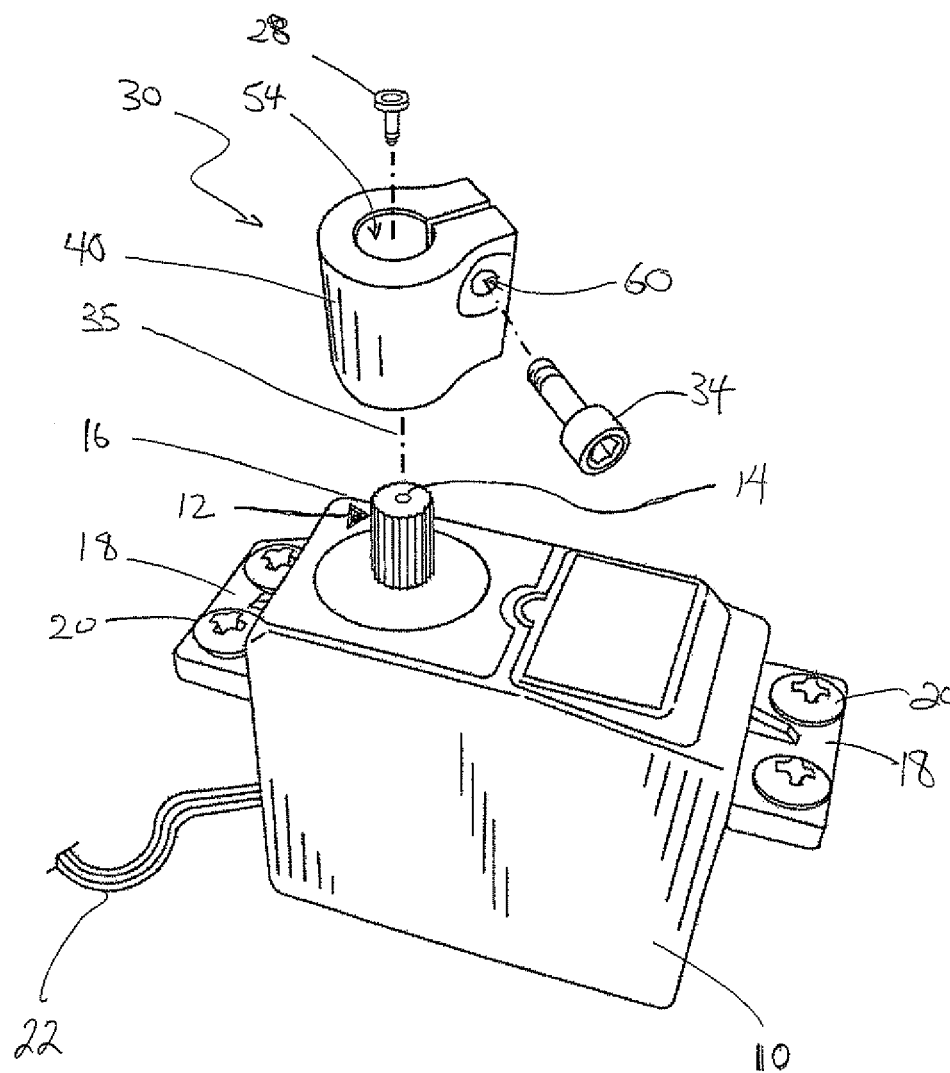
FIG. 1 is a top perspective view of an adapter positioned proximate a hobby servo.

FIG. 1 illustrates a servo motor 10 having a rotatable splined output shaft 12. Servo motor 10 includes a pair of flanges 18 for mounting servo motor 10 in an operating environment. Flanges 18 are adapted to receive mounting screws 20.

Electrical cable 22 is attached to the servo motor 10 to provide electrical power and/or electrical signals to cause the output shaft 12 to rotate in a counter-clockwise or clockwise direction. Servo motor 10 can be any type of servo motor including a hobby servo motor and is not limited in terms of its style, capacity, motor speed, or load carrying capability.

An output shaft adapter assembly 30 is configured to engage output shaft 12 of servo motor 10. Output shaft adapter assembly 30 is further configured to accept and be engaged with an auxiliary shaft 32 (shown in FIG. 2). Splined output shaft 12 and auxiliary shaft 32 are coupled along a longitudinal axis 35. In one embodiment, splined output shaft 12 has approximately 23 to 25 teeth. However, output shaft 12 can have any number of teeth. Output shaft 12 has a threaded orifice 14 that extends into the splined output shaft 12 from a distal end 16 of the splined output shaft 12.

The output shaft adapter assembly 30 includes an adapter body 40. In one example, adapter body 40 is formed from aluminum. However, body 40 can be made of any suitable material including, but not limited to, other metals, polymers, composite materials and so forth. Adapter body 40 will be described in more detail below. The output shaft adapter assembly 30 also includes a threaded fastener 28 that is configured to engage the threaded orifice 14 to secure adapter body 40 to splined output shaft 12.

As illustrated in FIG. 1, threaded fastener 28 is inserted through an aperture 54 formed in assembly 30. Threaded fastener 28 engages a portion of assembly 30 and threaded orifice 14 in output shaft 12, thereby securing assembly 30 to the output shaft. In one example, assembly 30 is engaged to hobby servo output shaft 12 (e.g., such that assembly 30 rotates with output shaft 12).

Figure 2:
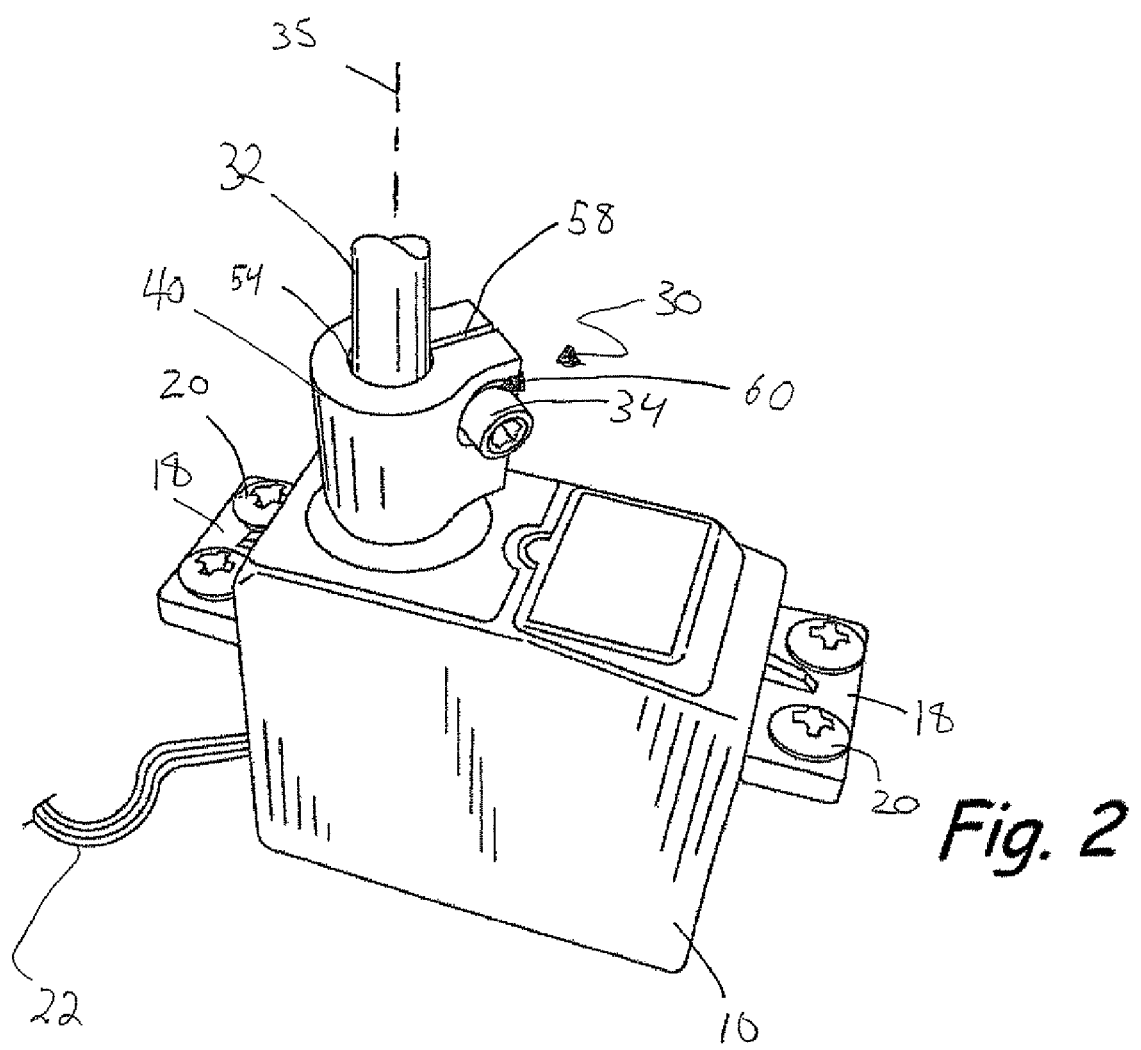
FIG. 2 is top perspective view of the adapter of FIG. 1 engaging a hobby servo and an auxiliary shaft.

FIG. 2 illustrates servo motor 10 and an auxiliary shaft 32 coupled by adapter assembly 30. Auxiliary shaft 32 can be adapted to engage a load to be driven by servo motor 10. Examples include, but are not limited to, wheels, steering mechanisms, and gear reduction assemblies configured to provide increased torque to a hobby device. Again, it is important to note that any suitable load can be adapted to be driven by auxiliary shaft 32.

Output shaft adapter assembly 30 includes an output bore 54 adapted to receive auxiliary shaft 32. While auxiliary shaft 32 is illustrated as a round shaft, any shape and size shaft can be received by assembly 30. For example, assembly 30 can be adapted to receive triangular or square shafts. In other examples, polygons having more than four sides can be received by assembly 30.

Fastener 34 is adapted to engage adapter body 40 at a lateral bore 60 that extends into the adapter body 40 generally perpendicular to a longitudinal axis 35. Bore 60 is configured such that when fastener 34 is tightened body 40 is deformed to some extent, thereby reducing gap 58. Thus, fastener 34 is configured to secure auxiliary shaft 32 within assembly 30. In one example, gap 58 is reduced such that bore 54 forms a relatively tight engagement to shaft 32 and rotatably engages assembly 30 and auxiliary shaft 32.

FIGS. 3 and 4 are top and bottom perspective views, respectively, of adapter assembly 30. Adapter assembly 30 includes an adapter body 40. Adapter body 40 has a generally cylindrical portion 46 having a first end 42, a second end 44, and an outer wall 65. Adapter body 40 has a tab portion 64 extending from cylindrical portion 46 to a longitudinally extending end surface 67. Tab 64 extends from the first end 42 to the second end 44 of the adapter body 40. In one example, tab 64 has a generally consistent thickness. However, tab 64 can have a taper, such as, from first end 42 to second end 44 or from outer wall 65 to end surface 67. Further, adapter body 40 can be manufactured by any suitable process such as, but not limited to, machining, molding, an extrusion process, or an additive process.

Output bore 54 extends into adapter body 40 from the first end 42. In one embodiment, the output bore 54 is a generally circular bore, but it should be understood that the output bore 54 can be sized and shaped to accept any auxiliary shaft 32. For example, bore 54 can be a square, pentagon, or any other polygon or non-polygon shape. Further, output bore 54 can include a tapered surface 55 at the first end 42 to allow for ease of insertion of the auxiliary shaft 32. The output bore 54 can be formed into the adapter body 40 by machining the adapter body 40, as part of a molding or additive process, or through any other suitable process.

Adapter body 40 includes an input bore 48 extending into adapter body 40 from second end 44. In one example, input bore 48 has a hexagonal shape configured to accept a generally hollow engagement member 50 having a female spline receiver formed therein. Engagement member 50 is further configured to engage a splined output shaft (i.e., shaft 12 illustrated in FIG. 1). However, input bore 48 can have any size and shape to accept any particular engagement member. For example, an engagement member can have an exterior surface that is a regular or irregular polygon, a circle or oval, or any other shape without limitation. Further, input bore 48 can be formed such that it has an integral female spline receiver (not shown in any drawings) to accept the splined output shaft 12 of the servo motor 10. For example, input bore 48 and engagement member 50 can be manufactured as a single piece of material.

Engagement 50 can be comprised of plastic material. However, engagement member 50 can be any material such as, but not limited to, PVC, metal, or any other suitable material. Further, engagement member 50 can have any engagement configuration suitable to engage a servo output shaft. In various embodiments, engagement member 50 has a 23, 24, or 25-tooth configuration. However, it is important to note that engagement member 50 can have any suitable configuration to engage servo motor 10.

Slit 58 extends into the tab 64 longitudinally from the first end 42 to the second end 44 of the adapter body 40. Slit 58 splits tab 64 into first and second parts 66 and 68. In one embodiment, slit 58 extends into output bore 54 from end surface 67.

First part 66 and second part 68 each have lateral bore 60 extending therethrough. As illustrated, lateral bore 60 is proximate first end 42 of the adapter body 40. In one example, at least a portion of lateral bore 60 in the second part 68 of tab 64 is threaded such that it can engage a fastener 34. When torque is applied to the fastener 34 to cause it to be tightened, the first part 66 and the second part 68 are drawn together such that slit 58 is compressed and the material of the adapter body 40 proximal to the output bore 54 is slightly deformed. When the auxiliary shaft 32 is positioned within the output bore 54, the resultant deformation of the adapter body 40 creates a retaining force to secure the auxiliary shaft 32 within the output bore 54.

FIGS. 5 and 6 illustrate cross sectional views of the adapter body 40 taken along line 5-5 in FIG. 4. An inner surface 69 (as defined by the slit 58) of the first part 66 of tab 64 is shown along with the cross section of the cylindrical portion 46. Output bore 54 is extends from a first end 42 of the cylindrical portion 46 of the adapter body 40. Input bore 48 has a plurality of faces 49 that engage with a corresponding set of faces 51 on engagement member 50. As illustrated in FIG. 4, engagement member 50 is a polygonal shape having six sides. Further, input bore 48 has a corresponding number of faces 49 (i.e., six faces). However, it is important to note that any configuration (i.e., shape and size) of input bore 48 and engagement member 50 is within the scope concepts described herein.

Further, an adapter body 40 having a particular output bore 54 shape and size can be configured to be utilized with a plurality of engagement member 50 configurations. In other words, a plurality of similar adapter bodies 40 can be manufactured and configured to engage varying output spline configurations by utilizing different engagement members 50. For example, a 23 tooth engagement member can be utilized with one adapter body configuration while a 25 tooth engagement member can be utilized with a substantially similar adapter body configuration. Similarly, adapter bodies having similar configurations can be manufacture having different bore 54 sizes for engaging varying auxiliary shaft sizes.

Divider 52 extends between the input bore 48 and the output bore 54. In one example, divider 52 is integrated with a portion of material that forms adapter body 40. Divider 52 discourages engagement member 50 from passing through the interior bore of body 40.

As illustrated, divider 52 can be positioned such that output bore 54 extends further into the coupler body 40 than input bore 48. In some examples, output bore 54 extends more than three times further into the coupler body than input bore 48. This provides for an enlarged surface area of the auxiliary shaft 32 that can be accepted into the adapter body 40 and retained by the retaining force applied with the fastener 34 engages the lateral bore 60.

An orifice 56 extends through divider 52 to join the input bore 48 with the output bore 54. When the adapter body 40 is positioned on a servo 10 such that the splined output shaft 12 is inserted into the input bore 48, a threaded fastener 28 (shown in FIG. 1) is utilized to secure the adapter body 40 to the spline output shaft 12. In one example, fastener 28 is threaded through orifice 56 and into threaded orifice 14 on the output shaft. While the output shaft adapter assembly 30 is described above as being configured to be engaged with a splined output shaft 12, it should be appreciated that it can be configured to engage any sort of output shaft. The adapter assembly 30 can be configured to engage any suitable servo output mating engagement.

Although the present invention has been described with reference to preferred embodiments, workers skilled in the art will recognize that changes may be made in form and detail without departing from the spirit and scope of the invention.

What is claimed is:

1. An adapter for coupling an output shaft of a servo to an auxiliary shaft, comprising:
    an adapter body having a longitudinal axis extending from a first end to a second end, wherein the adapter body includes:
        a first bore centered on the longitudinal axis and extending into the first end a first distance, the first bore configured to accept a portion of the auxiliary shaft;
        a second bore centered on the longitudinal axis and extending into the second end a second distance;
        a first fastener disposed proximate the first end, wherein adjusting the first fastener deforms a cross sectional dimension of the first bore;
        a divider integrated with a portion of material that forms the adapter body positioned between the first bore and the second bore, the divider being separated from the first end by the first distance and being separated from the second end by the second distance, the divider having an orifice that extends from the first bore to the second bore; and
        a second fastener configured to extend from the first bore, through the orifice and into the second bore, wherein the second fastener is configured to engage the output shaft of the servo to secure the adapter to the output shaft; and
    an engagement member positioned within the second bore, wherein an inner surface of the engagement member has a female spline configuration to accept and engage a portion of the output shaft of the servo.

2. The adapter of claim 1, wherein the adapter body has a generally cylindrical portion with a tab that extends laterally from the cylindrical portion.

3. The adapter of claim 2, wherein the tab includes a slit formed therein.

4. The adapter of claim 2, wherein the tab has a lateral bore extending therethrough, wherein the lateral bore is configured to accept a laterally positioned fastener, which, when attached, causes the adapter body proximal to the first bore to deform.

5. The adapter of claim 1, wherein the first distance is greater than the second distance.

6. The adapter of claim 5, wherein the first distance is more than three times greater than the second distance.

7. The adapter of claim 6 wherein the first bore includes a tapered surface at the first end.

8. The adapter of claim 1 wherein the adapter body and the engagement member are made from different pieces of material.

9. The adapter of claim 1 wherein an outer surface of the engagement member has a polygonal shape and an inner surface of the second bore has a corresponding polygonal shape.

10. The adapter of claim 1 wherein the engagement member is made of a PVC material.

11. A servo motor for hobby applications configured to be coupled to an auxiliary shaft, comprising:
    a rotatable output shaft having a spline configuration; and
    an adapter having a first end and a second end, the adapter coupled to the rotatable shaft and including:
        a generally cylindrical portion;
        a tab that extends laterally from the generally cylindrical portion, the tab having a slit that extends from the first end of the adapter to the second end of the adapter;
        a divider integrated with a portion of material that forms the adapter body and positioned between the first and the second ends of the adapter, the divider having an orifice extending between the first bore and the second bore;
        a first bore centered on a longitudinal axis and extending from the first end of the adapter to the divider, the first bore configured to accept a portion of the auxiliary shaft, wherein narrowing a width of the slit causes the first bore to frictionally engage the portion of the auxiliary shaft;
        a second bore centered on the longitudinal axis and extending from the second end of the adapter to the divider;
    an engagement member positioned within the second bore, the engagement member configured to accept and positively engage a portion of the output shaft of the servo motor; and
    a fastener extending through the orifice to engage the rotatable output shaft so as to secure the adapter to the rotatable output shaft, wherein the fastener is concealed within the adapter when the adapter is secured to the rotatable output shaft.

12. The servo motor of claim 11, wherein the adapter includes another fastener that compresses the slit.

13. The servo motor of claim 12, wherein the rotatable output shaft has a spline configuration, wherein the engagement member has a mating spline configuration.

14. The servo motor of claim 11 wherein the generally cylindrical portion, the tab, the divider and the engagement member are formed from aluminum.

15. The servo motor of claim 11 further comprising a second fastener oriented perpendicular to the longitudinal axis.

16. An apparatus for attachment to an output shaft of a servo, the apparatus comprising:
    a generally cylindrical body having a longitudinal axis, a first end, a second end, and a laterally extending tab, the tab having a slit with a first width;
    a first bore extending into the first end and aligned with the longitudinal axis, the first bore being in communication with the slit, wherein adjustment of the slit to a second width different from the first width changes a size of the first bore;
    a second bore extending into the second end and aligned with the longitudinal axis, the second bore comprising a plurality of splines;
    a divider integrated with a portion of material that forms the cylindrical body and positioned between the first bore and the second bore and having an orifice that extends from the first bore to the second bore; and
    a fastener configured to extend from the first bore, through the orifice and into the second bore, wherein the fastener is configured to engage the output shaft of the servo to secure the apparatus to the output shaft.

* * * * *